United States Patent
Yoshida

[11] Patent Number: 5,983,724
[45] Date of Patent: Nov. 16, 1999

[54] SHOCK SENSOR WITH ROTATING MAGNETORESTRICTIVE EFFECT ELEMENT

[75] Inventor: Yuki Yoshida, Tokyo, Japan

[73] Assignee: Oki Electric Industry Co., Ltd., Tokyo, Japan

[21] Appl. No.: 08/984,684

[22] Filed: Dec. 3, 1997

[30] Foreign Application Priority Data

Dec. 3, 1996 [JP] Japan .................................. 8-322710

[51] Int. Cl.⁶ .............................. G01N 1/00; G01P 15/00; G01V 1/16
[52] U.S. Cl. ........................................................ 73/652
[58] Field of Search ........................ 73/649, 652, 514.39, 73/519.01, 520.01; 200/61.45; 340/669, 566

[56] References Cited

U.S. PATENT DOCUMENTS

| | | | |
|---|---|---|---|
| 3,906,802 | 9/1975 | Nonaka et al. | 73/514.39 |
| 3,940,999 | 3/1976 | Nonaka et al. | 73/514.39 |
| 4,079,360 | 3/1978 | Ookubo et al. | 365/158 |
| 4,864,288 | 9/1989 | Cross | 340/566 |
| 5,180,892 | 1/1993 | Yoshimura et al. | 200/61.45 |

FOREIGN PATENT DOCUMENTS

| | | |
|---|---|---|
| 0 306 178 | 3/1989 | European Pat. Off. . |
| 0 486 186 | 5/1992 | European Pat. Off. . |
| 07198738 | 8/1995 | Japan . |
| 08029444 | 2/1996 | Japan . |
| WO 9323984 | 12/1993 | WIPO . |

*Primary Examiner*—William Oen
*Attorney, Agent, or Firm*—Venable; Robert J. Frank

[57] ABSTRACT

A shock sensor detects shocks from all directions in a plane. A shock-sensing member extends longitudinally and is housed in a case. The shock-sensing member is rotatably supported by a supporting pin at an off-center point in terms of mass of the shock-sensing member. The shock-sensing member has a magnet mounted on each of two diametrically opposing ends of the shock-sensing member. Each magnet opposes a magnetoresistive effect element fixed in the case. The magnetoresistive effect element may include four elements electrically connected in a bridge configuration. When the shock-sensing member receives a shock, the shock-sensing member rotates about the supporting member causing the magnetoresistive effect element to be subjected to a change in the magnetic field of the magnet. The output of the magnetoresistance changes with changes in the magnetic field and is processed by an output circuit which in turn outputs a sensor output accordingly.

10 Claims, 9 Drawing Sheets

(DISPLACEMENT OF MAGNETIC FIELD WITH RESPECT TO MR ELEMENT)

SHOCK SENSOR WITH ROTATING MAGNETORESTRICTIVE EFFECT ELEMENT

BACKGROUND OF THE INVENTION

1. Field of the Invention

The present invention relates to shock sensors and more particularly to a shock sensor for use in an air bag system for automobiles.

2. Description of Related Art

An air bag system is employed in an automobile in order to protect the driver from a shock when the automobile collides with another automobile or the like. A shock sensor detects a shock and outputs a detection signal. The detection signal activates a firing device of an air bag which in turn causes the air bag to quickly inflate to protect the driver from the shock.

Prior art shock sensors are disclosed in, for example, Japanese Patent Preliminary Publications No. 7-198738 and No. 8-29444.

Figure 16:
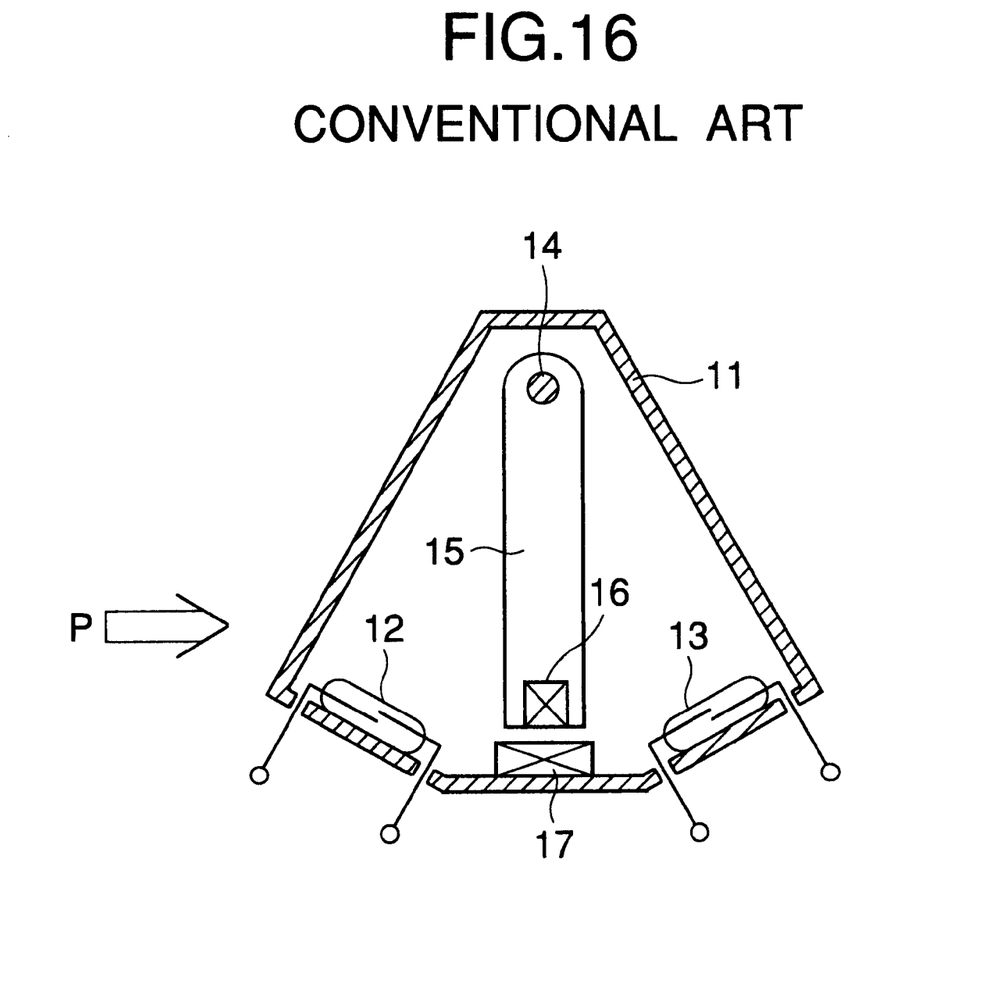
FIG. 16 illustrates a conventional art shock sensor.

FIG. 16 illustrates a conventional shock sensor.

Referring to FIG. 16, a magnet 16 is housed in a case 11 and attached to one end of a shock-sensing element 15 which is swingably supported on a pin 14. The shock-sensing element 15 is normally at its neutral position shown in FIG. 16 so that the magnet 16 is normally positioned directly over a magnetic element 17 fixedly mounted in the case 11. The neutral position is a position where the shock-sensing element 15 is at rest when no shock is applied thereto. Mounted on both sides of the magnetic element 17 are reed switches 12 and 13 which are closed when the magnet 16 moves to positions over the reed switches 12 and 13. The reed switches are normally open since the magnet 16 is directly over the magnetic element 17.

If a shock is applied to the shock sensor in a direction shown by arrow P, the shock-sensing element 15 acquires a momentum and swings counterclockwise. Thus, the shock-sensing element 15 is moved out of its neutral position. Thus, the magnet 16 moves into an area where the reed switch 13 is closed.

However, the principle of the conventional art reed switch type shock sensor dictates that the sensor is mounted in such a way that the shock-sensing element 15 is always suspended vertically. In addition, the sensor detects shocks only in a narrow range of direction in which the shock-sensing element 15 can swing sufficiently. Thus, shocks in any other directions outside of the range are not detected properly. The shock is converted into an electrical signal in terms of on-off operation of the reed switches 12 and 13. Use of a reed switch is an obstacle to miniaturizing a shock sensor. Another problem with the conventional art sensor is that the detection signal of the shock sensor is outputted only in limited signal form since the reed switches in FIG. 16 are normally open.

SUMMARY OF THE INVENTION

An object of the invention is to provide a shock sensor where the sensor operates regardless of whether it is mounted vertically or horizontally.

Another object of the invention is to provide a miniaturized shock sensor.

Yet another object of the invention is to provide a shock sensor where the detection signal can be outputted in a variety of signal forms.

A shock-sensing member extends longitudinally and is housed in a case. The shock-sensing member is rotatably supported on a supporting pin at an off-center point such that a moment of inertia on one side of the supporting pin is greater than a moment of inertia on the other side of the supporting pin. The shock-sensing member has at least one magnet mounted on one side of the supporting pin. Preferably, a magnet is mounted at each of opposing ends of the shock-sensing element such that the magnet opposes a magnetoresistive effect element fixed in the case. Each magnetoresistive effect element may include four elements in a bridge configuration. When the shock-sensing member receives a shock, the shock-sensing member rotates about the supporting member causing the magnetoresistive effect element to be subjected to a change in the magnetic field of the magnet. The output of the magnetoresistance changes with changes in the magnetic field and is processed by an output circuit which in turn outputs a sensor output.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

First Embodiment

Figure 1:
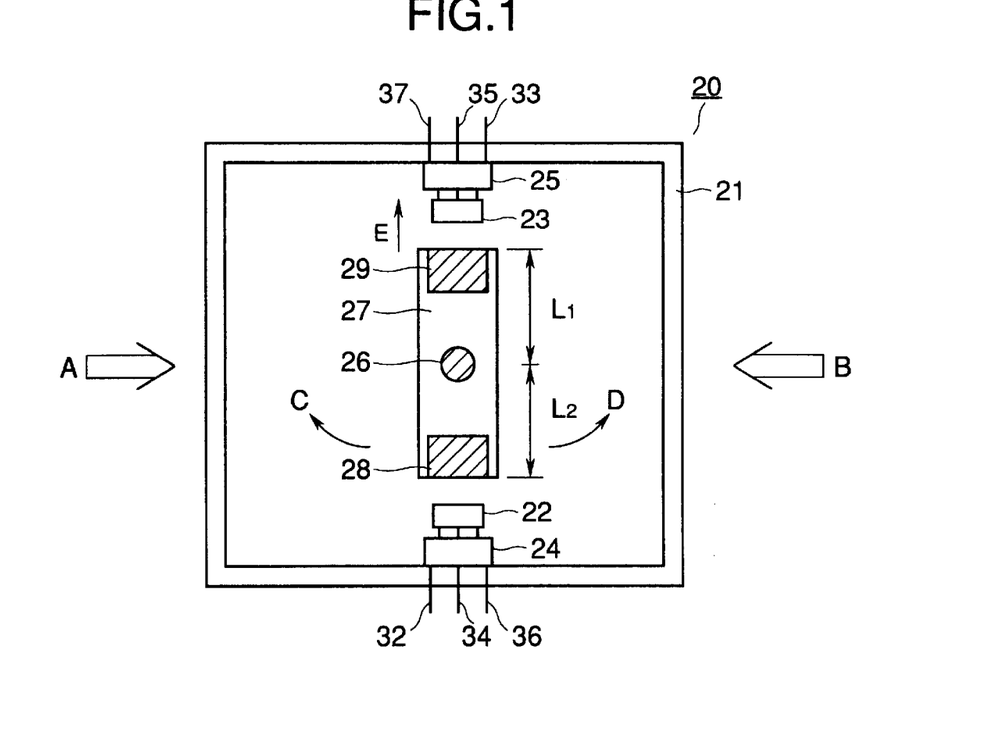
FIG. 1 illustrates a general construction of a shock sensor according to a first embodiment of the invention.
Figure 2:
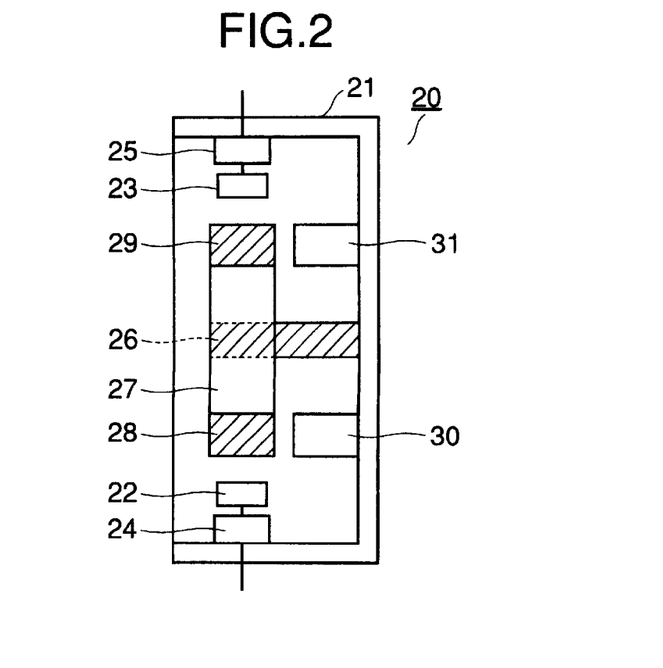
FIG. 2 is a side view of the shock sensor of FIG. 1.
Figure 3A:
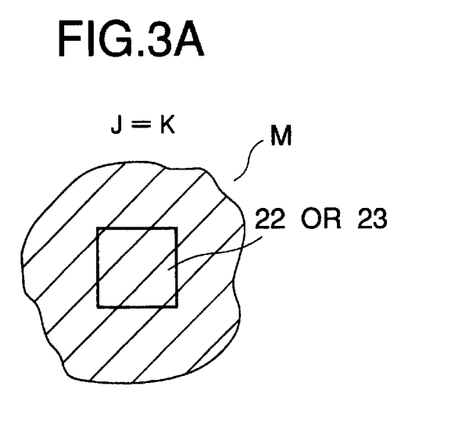
FIG. 3A–3C illustrate positional relationships between the magnetic field of the magnet and the MR (magnetoresistive effect) element.
Figure 3B:
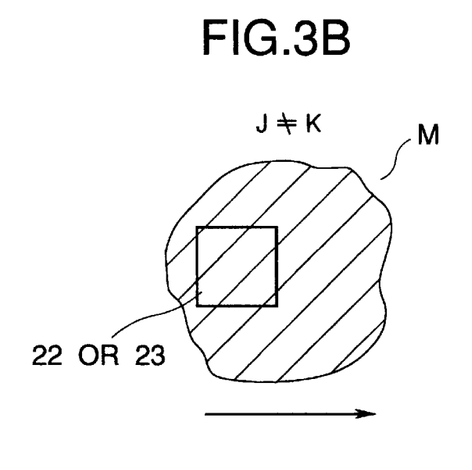
Figure 3C:
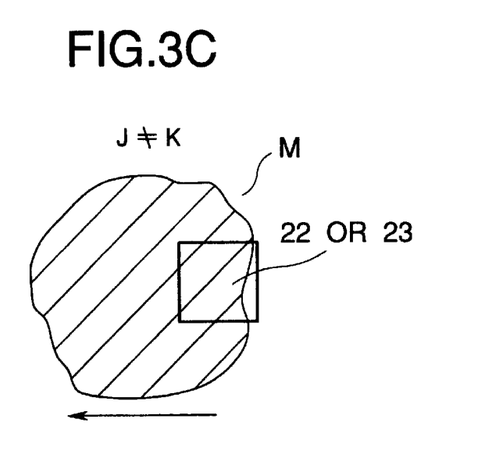

FIG. 1 illustrates a general construction of a shock sensor 20 according to a first embodiment of the invention. FIG. 2 is a side view of the shock sensor. FIG. 3A–3C illustrate positional relationships between the magnetic field M of the magnet and the magnetoresistive effect (referred to as MR hereinafter) element when seen in a direction shown by arrow E. The shock sensor of the first embodiment can directly replace the conventional art shock sensor.

Referring to FIGS. 1 and 2, a shock-sensing element 27 has magnets 28 and 29 mounted at its longitudinal ends and is pivotally supported substantially at its middle on a pin 26. Magnetic elements 30 and 31 are located to oppose and attract the magnets 28 and 29 so that the shock-sensing element 27 is normally at its neutral position shown in FIGS. 1 and 2. MR elements 22 and 23 are disposed in the longitudinal direction of the shock-sensing element 27 and oppose the magnets 28 and 29, respectively. The MR elements 22 and 23 are positioned with respect to the magnets 28 and 29 so that the MR elements 22 and 23 will not interfere when the shock-sensing element rotates in response to a shock applied thereto.

Shapers 24 and 25 are provided which receive the outputs of the MR elements 22 and 23 and outputs reformed outputs. The shapers 24 and 25, shock-sensing element 27, MR elements 22 and 23, and magnetic elements 30 and 31 are all housed in the case 21.

The case 21 has power terminals 32 and 33, output terminals 34 and 35, and ground terminals 36 and 37 mounted thereon and exposed on the outer surface of the case 21.

The shock-sensing element 27 is supported at an off-center point such that the mass on one side of the pin 26 is greater than the mass on the other side of the pin 26. The unbalance in mass is advantageous in that balance of the shock-sensing element is easily lost and the shock-sensing element moves out of its neutral position when a shock is applied thereto. For this purposes, the shock-sensing element 27 is supported slightly off its longitudinal center so that distance L1 is not equal to distance L2. Alternatively, the magnets 28 and 29 of different weights may be used.

Figure 4:
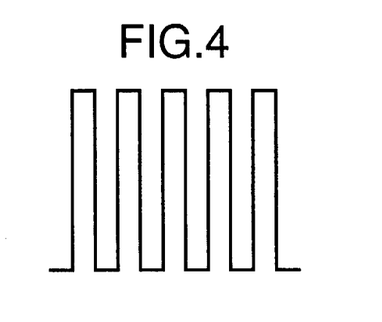
FIG. 4 illustrates the meander pattern of an MR element.

The resistivity of a magnetoresistive effect element varies when the elements are placed in a magnetic field. A magnetoresistive effect element is a thin film of an alloy whose major composition is a ferromagnetic metal and whose pattern is, for example, a meander line as shown in FIG. 4. The resistances of the MR elements 22 and 23 change depending on the strength of the magnetic field applied to them.

Figure 5:
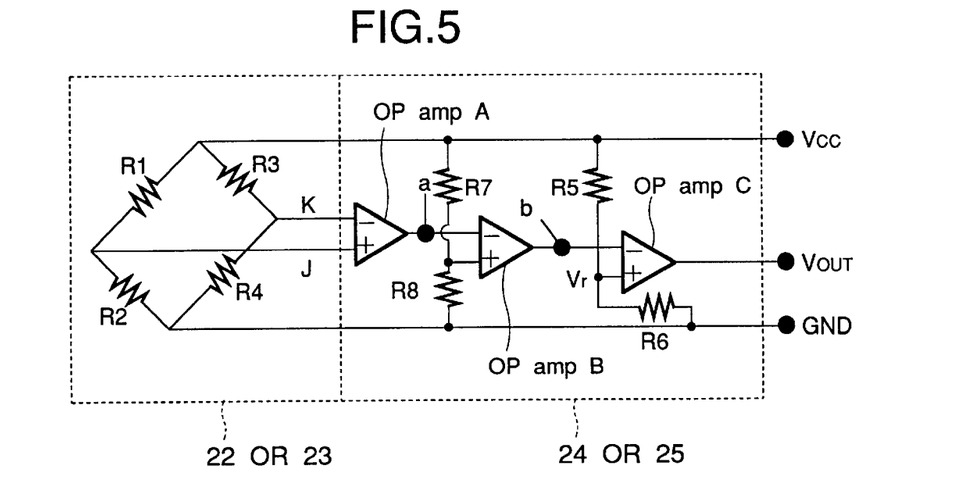
FIG. 5 is a schematic diagram illustrating the shapers.

FIG. 5 is a schematic diagram illustrating the shapers 24 and 25. The shapers 24 and 25 are of the same configuration.

Referring to FIG. 5, each of the MR elements 22 and 23 includes elements R1–R4 and is sensitive to shocks from two opposite directions. The elements R1–R4 are electrically connected in a bridge configuration, each element forming one arm of the bridge. The junction of R1 and R3 is connected to the supply voltage Vcc and the junction of R2 and R4 is connected to the ground GND. Output J is obtained from the junction of R1 and R2 and output K is obtained from the junction of R3 and R4.

In order for the bridge circuit to be balanced, the resistances of the MR elements R1–R4 are related so that R1/R2=R3/R4. The simplest relationship is R1=R2=R3=R4. The elements R1–R4 each have a resistance in the range from 2 to 3 KΩ. It is to be noted that at least one of the elements R1–R4 must be an MR element and the other elements may be ordinary resistors. The elements R1–R4 may be arranged in a plane normal to the direction of the magnetic field or in a plane parallel to the direction of the magnetic field. Moreover, the elements may also be aligned in the direction of the magnetic field. The four elements R1–R4 may be arranged in any way as far as the bridge becomes unbalanced when the magnetic field of the magnet displaces with respect to the MR element.

As shown Figs. 3A–3C, when shocks in a direction shown by arrows are applied to the shock sensor, the magnetic field M of the magnet 29 moves with respect to the MR element 22 or 23, thereby causing the elements R1–R4 to be subjected to different strength in magnetic field so that the bridge circuit of the elements R1–R4 becomes unbalanced. The strength of the magnetic field M decreases as the distance from the center increases.

Referring to FIG. 5, an operational amplifier A is a differential amplifier, an operational amplifier B is an inverse-logarithmic amplifier, an operational amplifier C is a voltage amplifier, and the resistors R5 and R6 form a voltage divider which provides a reference voltage Vr. The operational amplifier C outputs a sensor output Vout.

The output J is fed to a non-inversion terminal of the operational amplifier A and the output K is input to an inversion terminal. The operational amplifier A amplifies the difference between the outputs J and K.

The output of the operational amplifier A is input to an inversion terminal of the operational amplifier B and the non-inversion terminal of the operational amplifier B is connected to the junction of bias resistors R7 and R8. The operational amplifier B performs inverse-logarithmic amplification of the output of the operational amplifier A.

The output of the operational amplifier B is input to an inversion terminal of the operational amplifier C. A non-inversion terminal of the operational amplifier C is connected to the junction of the resistors R5 and R6. The operational amplifier C compares the output of the operational amplifier B with the voltage on the junction. The operational amplifier C amplifies the difference between the two inputs thereto and outputs a sensor output Vout.

Voltages applied to various terminals are such that the operational amplifiers A, B, C can operate properly.

The operation of the shock sensor of the aforementioned construction will now be described.

As shown in FIG. 1, when a shock is applied to the shock sensor 20 in a direction shown by arrow A or B so that the shock-sensing element 27 moves out of its neutral position, the shock-sensing element 27 acquires a momentum in a direction shown by arrow D or C, determined by its mass and the magnitude of the applied shock. The momentum causes the shock-sensing element 27 to rotate, so that the magnets 28 and 29 rotate. The rotation of the magnets 28 and 29 causes the elements R1–R4 of MR elements 22 and 23 to be subjected to changes in magnetic field.

Figure 6:
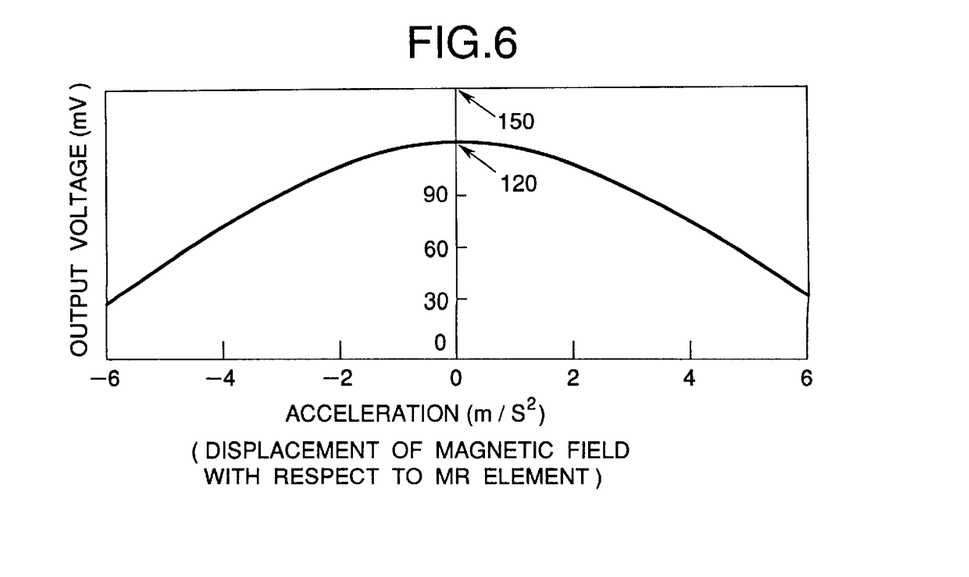
FIG. 6 shows the output on point a in FIG. 5.

Changes in magnetic field then causes the bridge circuit of R1–R4 to become unbalanced, producing a difference between the outputs J and K. The difference is amplified by the operational amplifier A. FIG. 6 shows the output on point a in FIG. 5 which varies logarithmically with acceleration, i.e., the displacement of magnetic field with respect to MR element 22 or 23.

Figure 7:
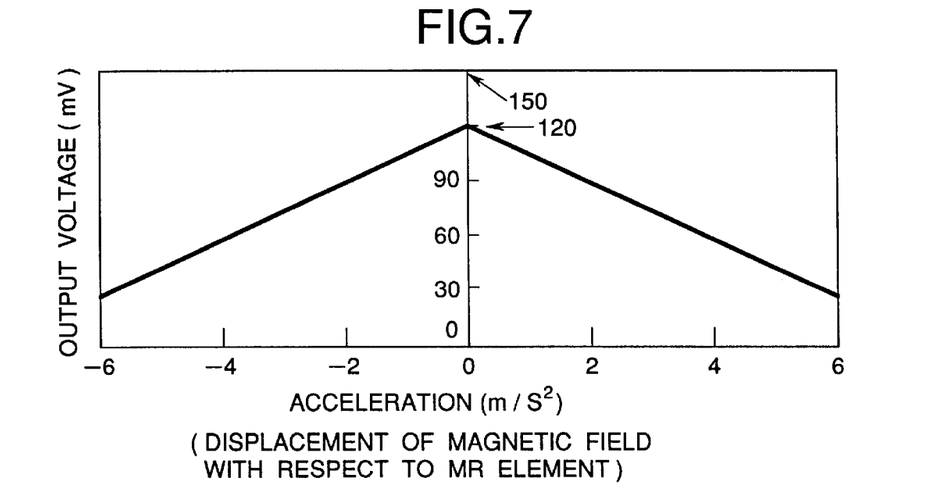
FIG. 7 illustrates linear changes in the output of the operational amplifier B.

The output on point a is inverse-logarithmically amplified by the operational amplifier B, so that the output on point b varies linearly as shown in FIG. 7.

Figure 8:
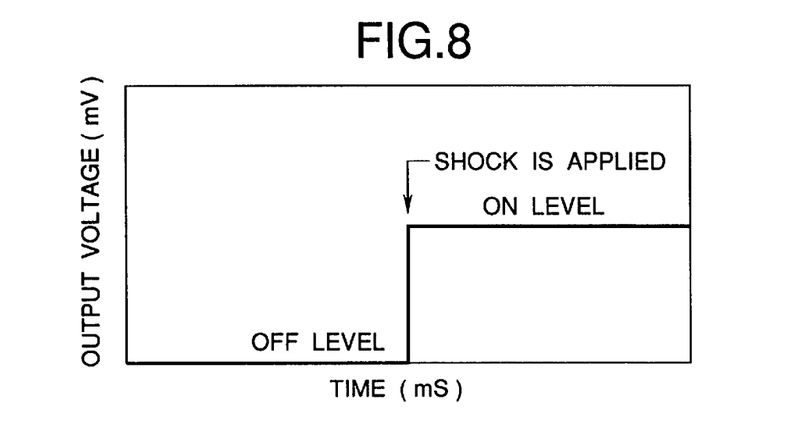
FIG. 8 shows the output of the operational amplifier C of FIG. 5.

As shown in FIG. 8, the operational amplifier C outputs an ON level if the output on point b is higher than the reference voltage Vr, and an OFF level if the output is lower than the reference voltage Vr.

Figure 9:
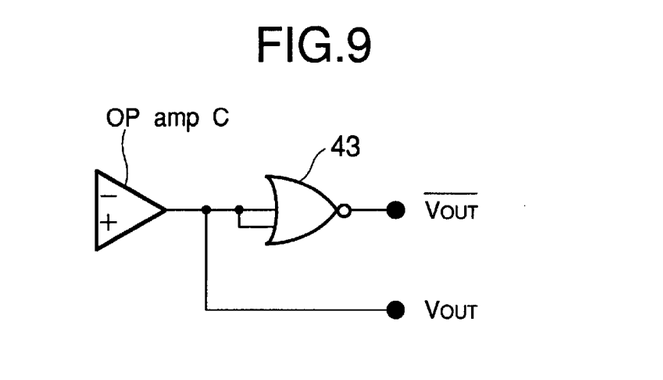
FIG. 9 illustrates a circuit arrangement that outputs two different logic signals as an sensor output.
Figure 10:
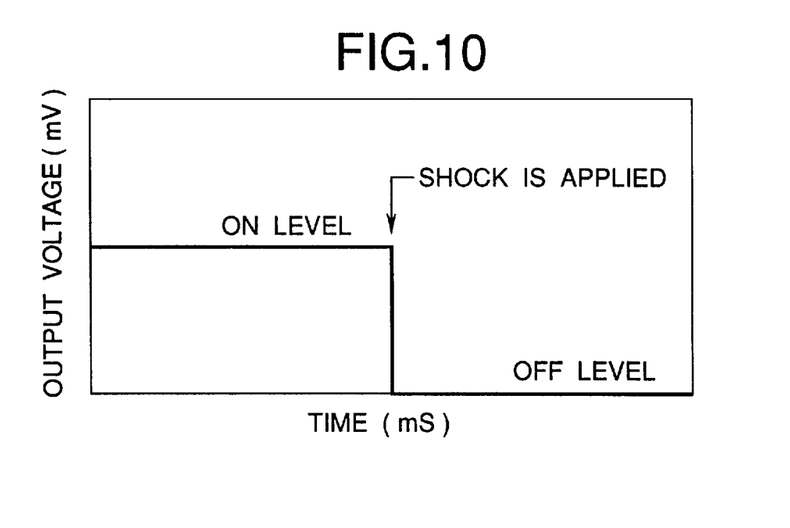
FIG. 10 shows an inverted waveform of the output of the operational amplifier C.

FIG. 9 illustrates a case where the output of the operational amplifier C is outputted as a sensor output Vout and the Vout is fed to a NOR gate 43 which outputs an inverted output as shown in FIG. 10. The configuration shown in FIG. 9 provides two sensor outputs of different logic levels.

The shock sensor 20 of the invention can be mounted either vertically, horizontally, or at any other angles with the pin 26 being oriented to extend horizontally. The shock sensor 20 can also be mounted such that the pin 26 extends in a direction different from the horizontal direction.

Figure 15:
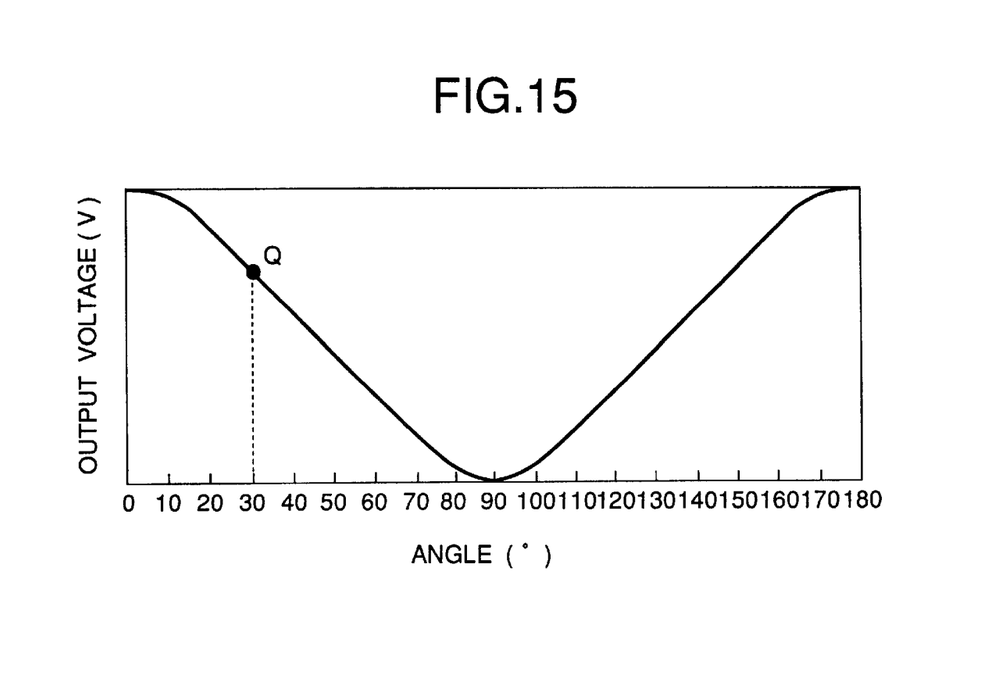
FIG. 15 illustrates the characteristic showing the relationship between the outputs of the MR element and the angles that a magnetic field makes with a plane in which the MR elements are arranged.

In the conventional art shock sensor, the shock-sensing element 15 shown in FIG. 15 is supported on the pin at a longitudinal end portion of the stock-sensing element 15, and the conventional art shock sensor must be mounted such that the pin comes at the top end and the shock-sensing element 15 is suspended by the pin. Therefore, the shock-sensing element 15 is allowed to swing only in a vertical plane including the length of the shock-sensing element. In order to detect shocks from any directions using the conventional art sensor, a large number of sensors are needed. In contrast, the shock sensor according to the present invention has a shock-sensing element 27 with magnets 28 and 29 mounted at its longitudinal end portions and the MR elements opposing the magnets. Detection of shocks is ensured by the two different values of moment of inertia resulting from the construction of the invention. Rotatably supporting the shock-sensing element 27 on the pin 26 permits detecting of shocks in any directions within a plane perpendicular to the pin 26.

The ability to detect shocks from a wide range of directions increases the reliability of an air bag activating device which is used in an air bag system for automobiles.

The output of the shock sensor may be directed to a logic circuit such as a NOR gate which outputs a binary signal, while also maintaining the output of the operational amplifier C available. By this arrangement, the shock sensor 20 becomes more versatile in applying the invention to a variety of air bag systems.

Second Embodiment

Figure 11:
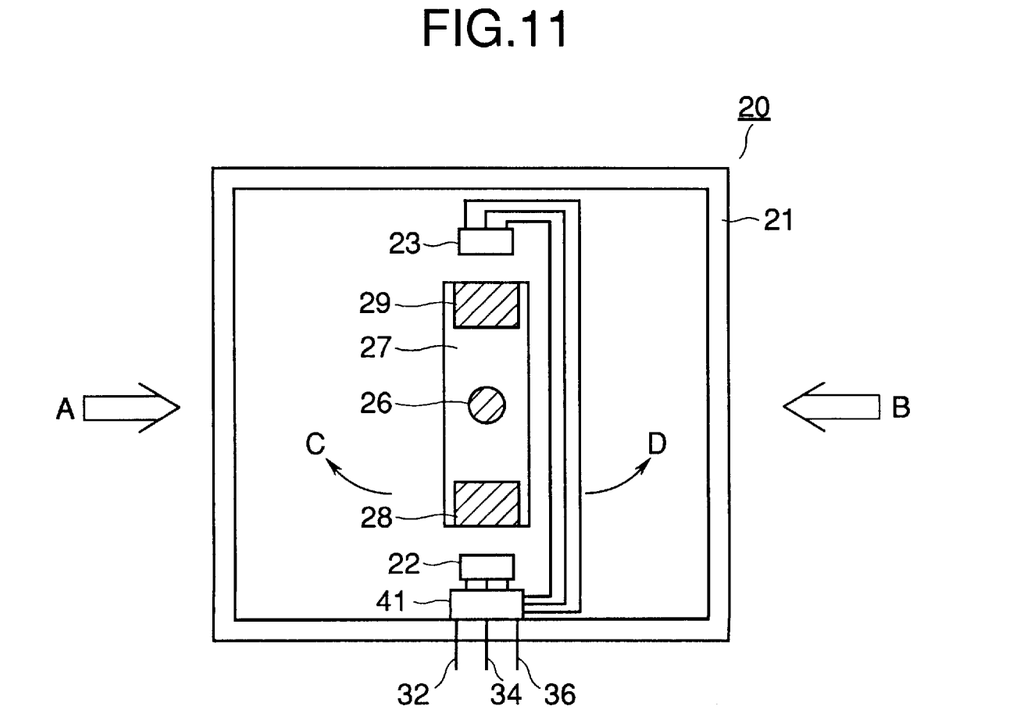
FIG. 11 illustrates a shock sensor according to a second embodiment.
Figure 12:
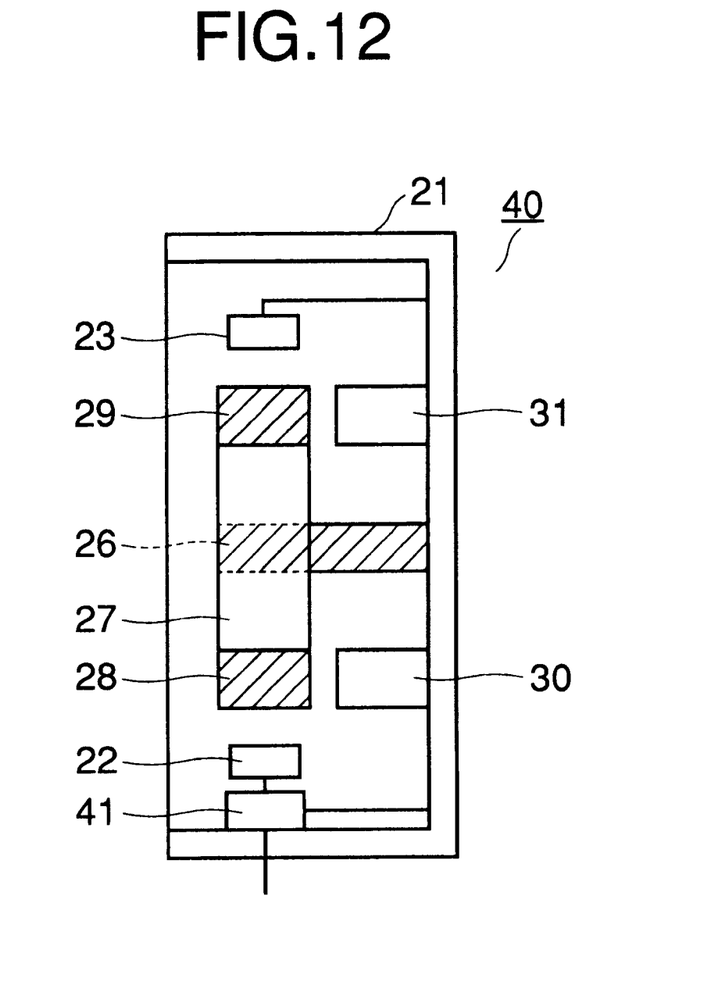
FIG. 12 is a side view of the shock sensor.

FIG. 11 illustrates a shock sensor according to a second embodiment and FIG. 12 is a side view of the shock sensor. Elements similar to those shown in FIGS. 1 and 2 have been given the same references.

Referring to FIG. 11, a shock sensor 40 includes MR elements 22 and 23, shaper 41 that reforms the output waveforms of the MR elements 22 and 23, shock-sensing element 27 rotatably supported on a support member 26, and magnets 28 and 29 securely mounted on longitudinal ends of the shock-sensing element 27, all being housed in a case 21.

The outputs of the two MR elements 22 and 23 are input to the shaper 41.

Referring to FIG. 12, there are provided magnetic elements 30 and 31 that oppose the magnets 28 and 29 in the case 21. The magnets 28 and 29 attract the magnetic elements 30 and 31, respectively, thereby holding the shock-sensing element 27 at its neutral position. The MR elements 22 and 23 and the magnets 28 and 29 are spaced apart so that the MR elements will not interfere with the shock-sensing element 27 when the shock-sensing element 27 rotates.

The power terminal 32, output terminal 34, and ground terminal 36 are mounted on the case 21 and are exposed on the outer surface of the case 21.

The shock-sensing element 27 is supported at a point such that the mass is greater on one side of the pin 26 than the mass on the other side of the pin 26.

Figure 13:
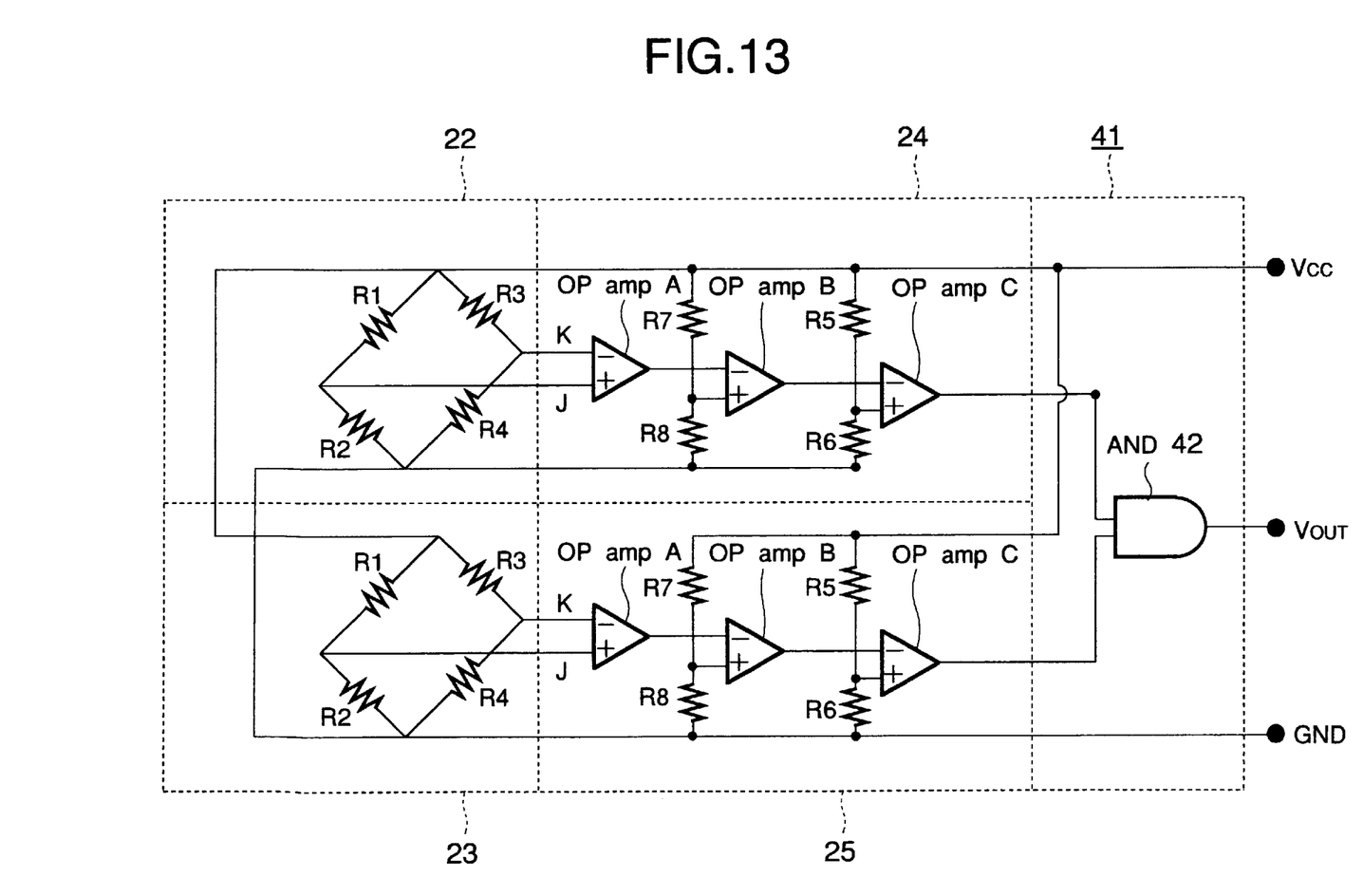
FIG. 13 is a schematic diagram of the shock sensor.

FIG. 13 is a schematic diagram showing the aforementioned shock sensor. Elements of the same configuration as the shaper shown in FIG. 5 have been given the same references and description thereof is omitted.

Referring to FIG. 13, a shaper 41 is of a configuration where an AND gate 42 outputs a logical product of the outputs of amplifier groups 24 and 25. The amplifier group 24 shapes the output of the MR element 22 and the amplifier group 25 shapes the output or the MR element 23. The output of the AND gate 42 is the sensor output Vout.

The operation of the shock sensor of the aforementioned construction will now be described.

As shown in FIG. 11, when a shock is applied to the shock-sensing element 27 in a direction shown by arrow A or B to disturb the neutral condition of the shock-sensing element, the shock-sensing element acquires a momentum in a direction shown by arrow D or C, determined by its mass and the applied shock. The momentum causes the shock-sensing element 27 to rotate so that the magnets 28 and 29 displace with respect to the MR element to change the magnetic field applied to the MR elements 22 and 23. Thus, the MR elements 22 and 23 operate on the same principle mentioned in the first embodiment.

Once a shock sensor outputs an output signal, the air bag will inflate regardless of whether the output is false or true. Therefore, a shock sensor must not output any false output. With the aforementioned construction, the shock sensor 40 fails if any one of the two MR elements fail.

In other words, the shock sensor of the second embodiment outputs a sensor output Vout only when all of the parts in the shock sensor work properly. Thus, the second embodiment provides a more reliable shock sensor.

The use of this shock sensor having the aforementioned features will improve the reliability of air bag system for automobiles.

The first and second embodiments have been described with respect to a shock sensor. The constructions described in the embodiments make it possible to use the shock sensor as a sensor for detecting an inclination if the shaper includes adjustable or replaceable external resistors.

An inclination sensor will be described with reference to FIGS. 14 and 15.

Figure 14:
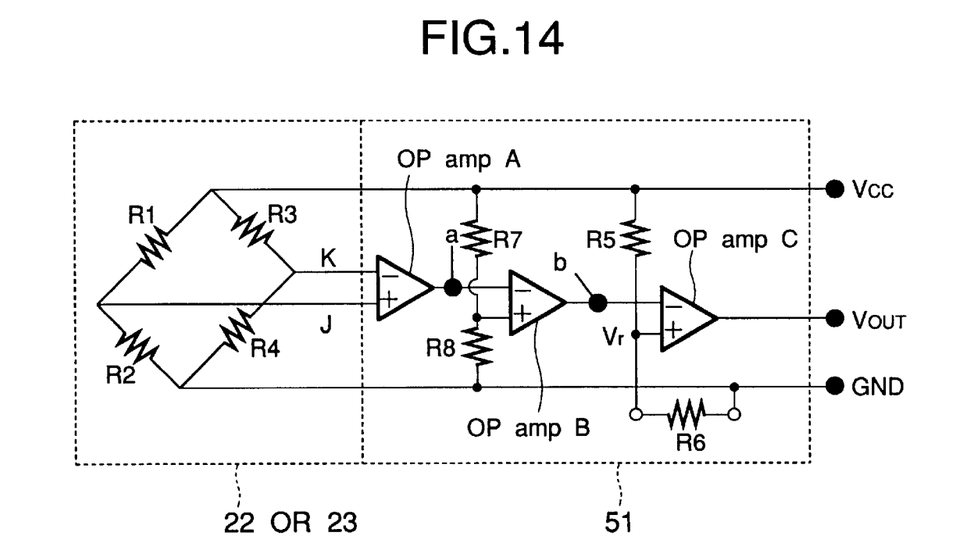
FIG. 14 is a schematic diagram showing a configuration of a shaper for use in an inclination sensor.

FIG. 14 is a schematic diagram showing a configuration of a shaper 51 for use in an inclination sensor. Parts corresponding to those in FIG. 5 have been given the same references.

Referring to FIG. 14, an operational amplifier C uses two resistors R5 and R6 that form a voltage divider to provide a reference voltage Vr. The resistor R6 may take the form of either a variable resistor or a plurality of resistors from which an appropriate value is selectively used.

FIG. 15 illustrates the characteristic showing the relationship between the outputs of the MR element and angles that a magnetic field makes with a plane in which the MR elements are arranged.

Referring to FIG. 15, an angle of 90 degrees implies that the direction of the magnetic field is normal to the plane in which the MR element lies. Likewise, angles of zero degrees and 180 degrees imply that the direction of magnetic field is parallel to the plane in which the MR element lies. For example, when the output of the MR element is at point Q as an operating point on the curve, the resistance of resistor R6 is adjusted to set the normal output Vout of the inclination sensor 51. Then, the sensor outputs its output when the sensor is inclined 30 degrees. Likewise, the inclination of the sensor at other angles may be detected by adjusting the resistor R6.

Another way to look at the same sensor is that the aforementioned construction provides a shock sensor with an adjustable sensitivity.

This shock sensor with an adjustable sensitivity may also be applied to an air bag system for automobiles. The shock sensor may of course be used in any apparatuses for the purpose of detecting shocks.

The MR elements, magnets, stock-sensing element, and operational amplifiers are not limited to the types and the number of them mentioned above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock sensor, comprising:

a shock-sensing member rotatably supported at a point between opposing ends by a supporting member fixed in a case, said shock-sensing member rotating about the supporting member when a shock greater than a predetermined value is applied thereto;

at least one magnet mounted to said shock-sensing member on one side of the supporting member;

at least one magnetoresistive effect element fixed in the case and arranged in a magnetic field of said magnet, said magnetoresistive effect element being exposed to a change in the magnetic field when said shock-sensing member rotates on the supporting member; and an output circuit processing an output of said magnetoresistive effect element to output a sensor output when said magnetoresistive effect element rotates about the supporting member.

2. The shock sensor of claim 1, wherein said shock-sensing member is supported by the supporting member at a point such that a moment of inertia on one side of the supporting member is greater than a moment of inertia on the other side of the supporting member.

3. The shock sensor of claim 1, wherein said output circuit outputs the sensor output having at least a first logic level and a second logic level opposite to the first logic level.

4. The shock sensor of claim 1, wherein said output circuit includes a circuit element for adjusting a characteristic of said output circuit.

5. The shock sensor of claim 4, wherein said characteristic is an operating point corresponding to a magnitude of a shock for which said output circuit outputs the sensor output.

6. The shock sensor of claim 4, wherein said circuit element is an external resistor which is variable or replaceable.

7. The shock sensor of claim 1, wherein said magnetoresistive effect element includes four elements arranged at predetermined intervals and electrically connected in a bridge configuration, each element being a predetermined distance away from a central area of the magnetic field.

8. The shock sensor of claim 1, wherein there are provided a first magnet mounted on one side of the supporting member and a second magnet on the other side of the supporting member, there are provided a first magnetoresistive effect element and a second magnetoresistive effect element, and said output circuit includes a first circuit for processing an output of the first magnetoresistive effect element, a second circuit for processing an output of the second magnetoresistive effect element, and a third circuit for outputting a sensor output on the basis of the outputs of the first and second circuits.

9. The shock sensor of claim 8, wherein said output circuit outputs the sensor output only when the output of the first circuit coincides with the output of the second circuit.

10. The shock sensor of claim 1, further including a magnetic member mounted on the case and opposing said magnet, wherein said magnetic member attracts said magnet so as to hold said shock-sensing member in position when a shock is not applied thereto.

* * * * *